(12) United States Patent
Chiu et al.

(10) Patent No.: US 11,322,733 B2
(45) Date of Patent: May 3, 2022

(54) NEGATIVE ELECTRODE MATERIAL AND NEGATIVE ELECTRODE COMPOSITE SLURRY FOR LITHIUM ION BATTERY

(71) Applicant: National Taiwan University of Science and Technology, Taipei (TW)

(72) Inventors: Chih-Wei Chiu, Taipei (TW); Chen-Yang Huang, Taipei (TW)

(73) Assignee: NATIONAL TAIWAN UNIVERSITY OF SCIENCE AND TECHNOLOGY, Taipei (TW)

(*) Notice: Subject to any disclaimer, the term of this patent is extended or adjusted under 35 U.S.C. 154(b) by 227 days.

(21) Appl. No.: 16/594,594

(22) Filed: Oct. 7, 2019

(65) Prior Publication Data

US 2021/0104729 A1    Apr. 8, 2021

(51) Int. Cl.

| | |
|---|---|
| *H01M 4/133* | (2010.01) |
| *H01M 4/134* | (2010.01) |
| *H01M 10/0525* | (2010.01) |
| *H01M 4/62* | (2006.01) |
| *H01M 4/02* | (2006.01) |
| *H01M 4/583* | (2010.01) |
| *H01M 4/38* | (2006.01) |

(52) U.S. Cl.
CPC .......... *H01M 4/133* (2013.01); *H01M 4/134* (2013.01); *H01M 4/386* (2013.01); *H01M 4/583* (2013.01); *H01M 4/621* (2013.01); *H01M 4/625* (2013.01); *H01M 10/0525* (2013.01); *H01M 2004/027* (2013.01)

(58) Field of Classification Search
CPC ...... H01M 4/133; H01M 4/134; H01M 4/364; H01M 4/382; H01M 4/386; H01M 4/583; H01M 4/621; H01M 4/622; H01M 4/625; H01M 2004/027; H01M 10/0525; Y02E 60/10
See application file for complete search history.

(56) References Cited

U.S. PATENT DOCUMENTS

2014/0287317 A1*  9/2014  Tiquet .................. C01B 33/027
429/231.8

FOREIGN PATENT DOCUMENTS

JP          2016154114       *   8/2016

* cited by examiner

*Primary Examiner* — Brittany L Raymond
(74) *Attorney, Agent, or Firm* — Muncy, Geissler, Olds & Lowe, P.C.

(57) ABSTRACT

A negative electrode material for a lithium ion battery comprises a carbon material, a silicon nanomaterial, and a first solvent. The carbon material comprises carbon nanotubes. The carbon material and the silicon nanomaterial are uniformly mixed in the first solvent. The weight percentage of the silicon nanomaterial is between 1% and 30%, and the amount of the carbon material is 1% to 30% of the amount of the silicon nanomaterial. A negative electrode composite slurry for a lithium ion battery comprises the negative electrode material and a graphite mixture material. The graphite mixture material comprises graphite and a second solvent. The graphite is uniformly mixed in the second solvent, and the weight percentage of the graphite is between 20% and 40%.

16 Claims, 5 Drawing Sheets

NEGATIVE ELECTRODE MATERIAL AND NEGATIVE ELECTRODE COMPOSITE SLURRY FOR LITHIUM ION BATTERY

BACKGROUND

Technology Field

The present disclosure relates to a negative electrode material and negative electrode composite slurry for a lithium ion battery.

Description of Related Art

In recent years, batteries are used as the electricity storage and output device for various applications such as the portable electronic products (e.g. mobile phones, tablets, GPS navigation devices), the transportation vehicles (e.g. electric vehicles and aerospace vehicles), and the storage of renewable energies. Among the batteries, the lithium ion battery is widely applied to the above electronic devices because it can be easily miniaturized and have a high capacity, and can obtain higher energy density than the lead-acid battery and nickel-cadmium battery.

The lithium ion battery includes a positive electrode, a negative electrode, a separator and an electrolyte. The negative electrode includes a negative electrode material related to charge and discharge reactions. At present, a carbon-based active material (e.g. graphite) is often used as the negative electrode material. However, the theoretical capacity of silicon (4200 mAh/g) is more than 10 times larger than the theoretical capacity of graphite (372 mAh/g). In order to increase the battery capacity, there are also studies on the use of silicon materials as the negative electrode material.

However, if silicon is used as the main material of the negative electrode, the volume expansion and contraction change will be large during the charge and discharge cycle, which may cause the quick capacity fading. The large volume change also easily causes the fragmentation of the surface of the negative electrode material, thereby generating a new surface. The generated new surface can induce the decomposition reaction of the electrolytic solution, thereby forming a decomposition product of the electrolyte (a coating film). Thus, the electrolyte is consumed, which results in a decline in the cycle characteristics of the battery. In addition, the electrical conductivity of the silicon material is also lower than that of the carbon material. Even if the particles of the silicon material are firstly nanosized and then mixed with the carbon material to reduce the effect of volume expansion and improve the electrical conductivity, the nanosized silicon material and the carbon material easily have the uneven dispersion issue, resulting in the self-discharge of battery.

Therefore, it is desired to provide a carbon-silicon negative electrode material and a negative electrode composite slurry that can solve the uneven dispersion issue and can prevent the issues of battery expansion, fast capacity fading, and low electrical conductivity.

SUMMARY

In view of the foregoing, an objective of this disclosure is to provide a carbon-silicon negative electrode material and a negative electrode composite slurry that can achieve the uniform dispersion, improve the capacity and cycle characteristics of the lithium ion battery utilizing the carbon-silicon negative electrode material and negative electrode composite slurry, and can prevent the issues of battery expansion and low electrical conductivity, thereby enhancing the performance of the lithium ion battery.

To achieve the above, this disclosure provides a negative electrode material for a lithium ion battery, which comprises a carbon material, a silicon nanomaterial, and a first solvent. The carbon material comprises a carbon nanotube. The carbon material and the silicon nanomaterial are uniformly mixed in the first solvent. A weight percentage of the silicon nanomaterial is between 1% and 30%, and an amount of the carbon material is 1% to 30% of an amount of the silicon nanomaterial.

In one embodiment, the negative electrode material further comprises a dispersant uniformly mixed in the first solvent, wherein an amount of the dispersant is 20% to 200% of the amount of the carbon material.

In one embodiment, the dispersant comprises polyethylene glycol tert-octylphenyl ether, polyethylene glycol octyl phenyl ether, polyvinyl pyrrolidone, sodium dodecyl sulfate, phospholipid, polyoxypropylene polyoxyethylene copolymer, or any combination thereof.

In one embodiment, the negative electrode material further comprises a first binder uniformly mixed in the first solvent, wherein a weight percentage of the first binder is between 0.1% and 0.3%.

In one embodiment, the first binder comprises acrylic acid, polyvinyl alcohol, aqueous acrylic resin, sodium alginate, gelatin, polyacrylonitrile, carboxymethyl cellulose, styrene butadiene rubber, or any combination thereof.

In one embodiment, the carbon material further comprises graphene, carbon black, or any combination thereof.

In one embodiment, a diameter of the carbon nanotube is between 1 nm and 20 nm, and a length of the carbon nanotube is between 1 μm and 10 μm.

In one embodiment, the diameter of the carbon nanotube is between 5 nm and 13 nm, and a length of the carbon nanotube is between 3 μm and 5 μm.

In one embodiment, the silicon nanomaterial comprises silicon nano-powder, silicon oxide nano-powder or a combination thereof, a molecular formula of the silicon nanomaterial is $SiO_x$, and x is between 0 and 2.

In one embodiment, the particle size of the silicon nanomaterial is between 10 nm and 200 nm.

In one embodiment, the first solvent is water, polyvinylpyrrolidone, or a combination thereof.

In one embodiment, the negative electrode material is uniformly mixed by ball milling dispersion or ultrasonic dispersion.

To achieve the above objective, this disclosure also provides a negative electrode composite slurry for a lithium ion battery, which comprises the above-mentioned negative electrode material and a graphite mixture material uniformly mixed with the negative electrode material. The graphite mixture material comprises graphite and a second solvent. The graphite is uniformly mixed in the second solvent, and a weight percentage of the graphite is between 20% and 40%.

In one embodiment, before mixing the negative electrode material and the graphite mixture material, the negative electrode material is treated by freeze-dry granulation or spray-dry granulation for removing the first solvent and forming granules with a particle size between 3 μm and 15 μm.

In one embodiment, the particle size is between 3 μm and 5 μm.

In one embodiment, the graphite mixture material further comprises a second binder uniformly mixed in the second solvent, and a weight percentage of the second binder is between 1% and 5%.

In one embodiment, the second binder comprises acrylic acid, polyvinyl alcohol, aqueous acrylic resin, sodium alginate, gelatin, polyacrylonitrile, carboxymethyl cellulose, styrene butadiene rubber, or any combination thereof.

In one embodiment, the second solvent is water, polyvinylpyrrolidone, or a combination thereof.

In one embodiment, 1% to 40% of the graphite is substituted by silicon powder, and a weight percentage of the graphite and the silicon powder in the graphite mixture material is between 20% and 40%.

As mentioned above, this disclosure can provide uniformly dispersed carbon-silicon negative electrode material and negative electrode composite slurry for improving the capacity and cycle characteristics of the lithium ion battery utilizing the carbon-silicon negative electrode material and negative electrode composite slurry, and preventing the issues of battery expansion and low electrical conductivity, thereby enhancing the performance of the lithium ion battery.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

This lithium ion battery adopts the negative electrode material and negative electrode composite slurry of this disclosure can have improved capacity and cycle characteristics, and can prevent the issues of battery expansion and low electrical conductivity, thereby enhancing the performance of the lithium ion battery.

Negative Electrode Material

A negative electrode material for a lithium ion battery according to this disclosure comprises a carbon material, a silicon nanomaterial, and a first solvent. The carbon material comprises a carbon nanotube. The carbon material and the silicon nanomaterial are uniformly mixed in the first solvent. The weight percentage of the silicon nanomaterial is between 1% and 30%, and the amount of the carbon material is 1% to 30% of the amount of the silicon nanomaterial. The carbon nanotube is a graphite tube having a nano-level diameter and length-width-height ratio. The diameter of the carbon nanotube is between 1 nm and 20 nm, and the length of the carbon nanotube is between 1 μm and 10 μm. The nanotube is a hollow tube structure formed by curving a single-layer or multilayer of graphite layers. Preferably, the diameter of the carbon nanotube is between 5 nm and 13 nm, and a length of the carbon nanotube is between 3 μm and 5 μm. In this embodiment, the carbon nanotube is used to increase the electrical conductivity of the negative electrode material. The silicon nanomaterial comprises silicon nano-powder, silicon oxide nano-powder or a combination thereof. The molecular formula of the silicon nanomaterial is $SiO_x$, and x is between 0 and 2. When the molecular formula of the silicon nanomaterial is Si (x=0), the silicon nanomaterial is silicon nano-powder. When the molecular formula of the silicon nanomaterial is SiO (x=1) or $SiO_2$ (x=2), the silicon nanomaterial is silicon oxide nano-powder. Alternatively, the silicon nanomaterial can be the mixture of Si, SiO and/or $SiO_2$. The particle size of the silicon nanomaterial is between 10 nm and 200 nm, and this disclosure is not limited. Since the particle size of the silicon nanomaterial is controlled to between 10 nm and 200 nm, the volume expansion effect of the lithium ion battery containing the negative electrode material, which is made of the silicon nanomaterial, can be decreased.

In this embodiment, the carbon material can further comprise graphene, carbon black, or any combination thereof. In one embodiment, the carbon material comprises the carbon nanotube and graphene. In another embodiment, the carbon material comprises the carbon nanotube and carbon black. In an additional embodiment, the carbon material comprises the carbon nanotube, graphene and carbon black. In this disclosure, each of the carbon nanotube, graphene and carbon black can be used to increase the electrical conductivity of the negative electrode material.

Figure 1A:
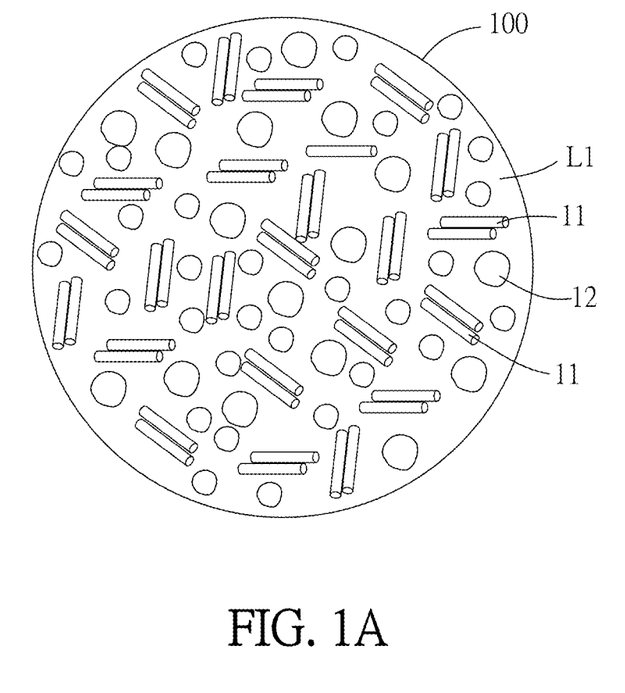
FIG. 1A is a schematic diagram showing the uniformly dispersed negative electrode material of this disclosure.

FIG. 1A is a schematic diagram showing the uniformly dispersed negative electrode material of this disclosure. The first solvent of this embodiment is water. In another embodiment, the first solvent is polyvinylpyrrolidone. In an additional embodiment, the first solvent is a combination of water and polyvinylpyrrolidone. As shown in FIG. 1A, the negative electrode material 100 comprises carbon material 11, a silicon nanomaterial 12, and a first solvent L1. The carbon material 11 and the silicon nanomaterial 12 are uniformly mixed in the first solvent L1. Preferably, the negative electrode material 100 is uniformly mixed by ball milling dispersion or ultrasonic dispersion.

In this embodiment, the negative electrode material further comprises a dispersant, and the dispersant, the carbon material and the silicon nanomaterial are uniformly mixed in the first solvent. The amount of the dispersant is 20% to 200% of the amount of the carbon material. The dispersant comprises polyethylene glycol tert-octylphenyl ether, polyethylene glycol octyl phenyl ether, polyvinyl pyrrolidone, sodium dodecyl sulfate, phospholipid, polyoxypropylene polyoxyethylene copolymer, or any combination thereof. Preferably, the dispersant is polyethylene glycol octyl phenyl ether (e.g. Triton), and the amount of the dispersant is 20% to 50% of the amount of the carbon material. In this embodiment, the dispersant is configured to more uniformly mix the carbon material and the silicon nanomaterial in the first solvent.

Figure 1B:
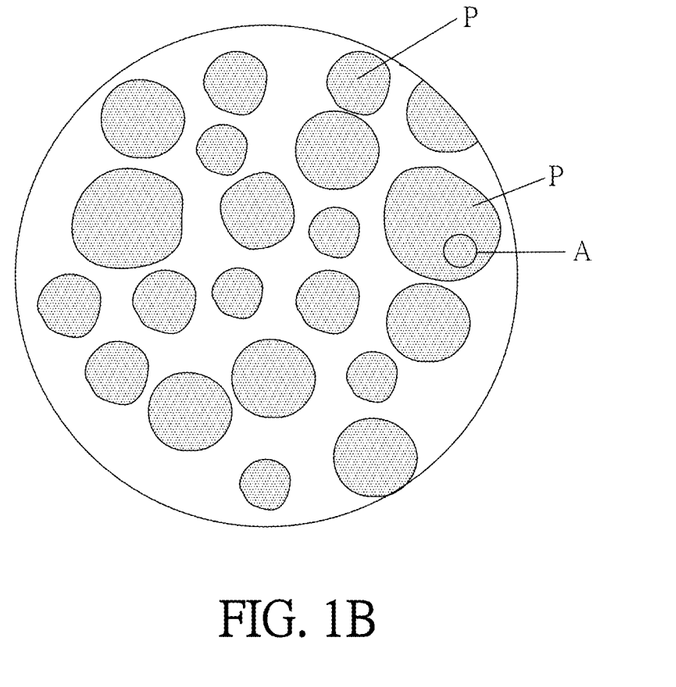
FIG. 1B is a schematic diagram showing the particles of the granulated negative electrode material of this disclosure.
Figure 1C:
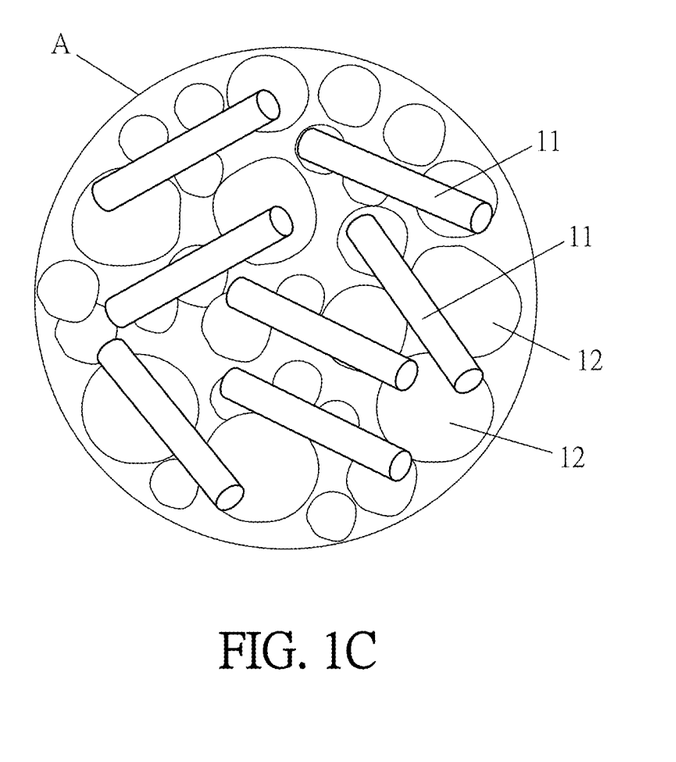
FIG. 1C is an enlarged view of a part of the particles of FIG. 1B.

FIG. 1B is a schematic diagram showing the particles of the granulated negative electrode material of this disclosure, FIG. 1C is an enlarged view of a part of the particles of FIG.

Figure 2A:
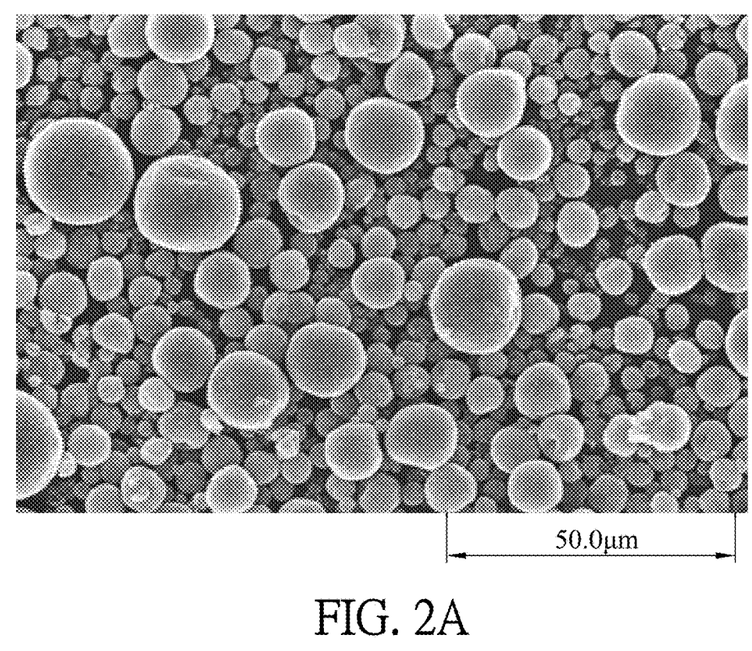
FIGS. 2A and 2B are images of the granulated negative electrode material observed by SEM.
Figure 2B:
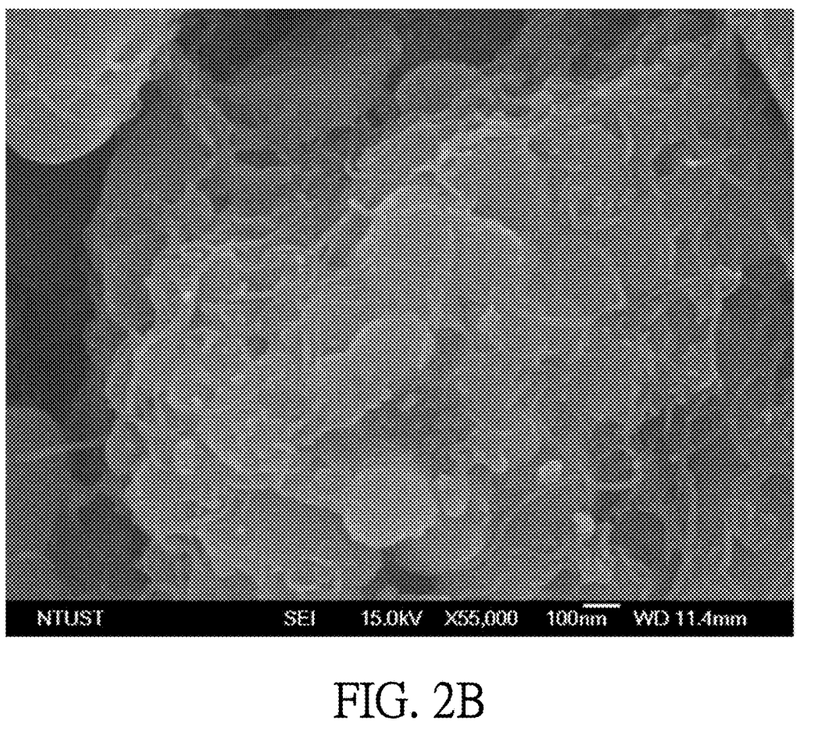

1B, and FIGS. 2A and 2B are images of the granulated negative electrode material observed by SEM. Referring to FIGS. 1A, 1C, 2A and 2B, in this embodiment, the negative electrode material further comprises a first binder, and the first binder, the carbon material, the silicon nanomaterial and/or the dispersant are uniformly mixed in the first solvent, and the weight percentage of the first binder is between 0.1% and 0.3%. The first binder comprises acrylic acid, polyvinyl alcohol, aqueous acrylic resin, sodium alginate, gelatin, polyacrylonitrile, carboxymethyl cellulose, styrene butadiene rubber, or any combination thereof. Preferably, the first binder comprises acrylic acid or polyvinyl alcohol. In one embodiment, the carbon material, the silicon nanomaterial and the dispersant are uniformly mixed in the first solvent, and then the first binder is added and mixed in the first solvent. Afterwards, the mixture solution is treated by freeze-dry granulation or spray-dry granulation for removing the first solvent and forming granules with a particle size between 3 μm and Preferably, the carbon material, the silicon nanomaterial and the dispersant are uniformly mixed in the first solvent, and then acrylic acid or polyvinyl alcohol (the first binder) is added and mixed in the first solvent. Afterwards, the mixture solution is treated by freeze-dry granulation or spray-dry granulation for removing the first solvent and forming granules with a particle size between 3 μm and 15 μm. As shown in FIGS. 1B and 1C, the configuration of the first binding makes the carbon material 11 and the silicon nanomaterial 12 to encapsulate each other, so that the consequent freeze-dry granulation or spray-dry granulation can form the fine particles P to be applied to the negative electrode composite slurry. As shown in FIGS. 2A and 2B, after treating the negative electrode material by the freeze-dry granulation or spray-dry granulation, the formed uniformly dispersed and fine particles can have a particle size between 3 μm and 15 μm. These fine particles can increase the capacity and cycle retention rate of the lithium ion battery containing the negative electrode material. The detailed descriptions thereof will be discussed hereinafter.

Negative Electrode Composite Slurry

The negative electrode composite slurry for a lithium ion battery of this disclosure comprises the above-mentioned negative electrode material and a graphite mixture material uniformly mixed with the negative electrode material. The graphite mixture material comprises graphite and a second solvent. The graphite is uniformly mixed in the second solvent, and the weight percentage of the graphite is between 20% and 40%. Referring to FIG. 1A, in one embodiment, before mixing the negative electrode material 100 and the graphite mixture material, the negative electrode material 100 is uniformly mixed by ball milling dispersion or ultrasonic dispersion. Then, the negative electrode material 100 is uniformly mixed with the graphite mixture material. In other words, the negative electrode material 100 is not treated by freeze-dry granulation or spray-dry granulation, so the first solvent L1 is still remained in the negative electrode material 100.

In another embodiment, before mixing the negative electrode material and the graphite mixture material, the negative electrode material is uniformly mixed by ball milling dispersion or ultrasonic dispersion. Then, the negative electrode material is treated by freeze-dry granulation or spray-dry granulation for removing the first solvent and forming granules with a particle size between 3 μm and 15 μm. Afterwards, the negative electrode material is uniformly mixed with the graphite mixture material. In other words, the negative electrode material is treated by ball milling dispersion or ultrasonic dispersion, and then treated by freeze-dry granulation or spray-dry granulation (for removing the first solvent), and the treated negative electrode material is then mixed with the graphite mixture material. In other words, before mixing the negative electrode material and the graphite mixture material, the negative electrode material is treated by freeze-dry granulation or spray-dry granulation for forming granules with a particle size between 3 μm and 15 μm. Preferably, the particle size of the formed granules is between 3 μm and 5 μm.

Figure 3:
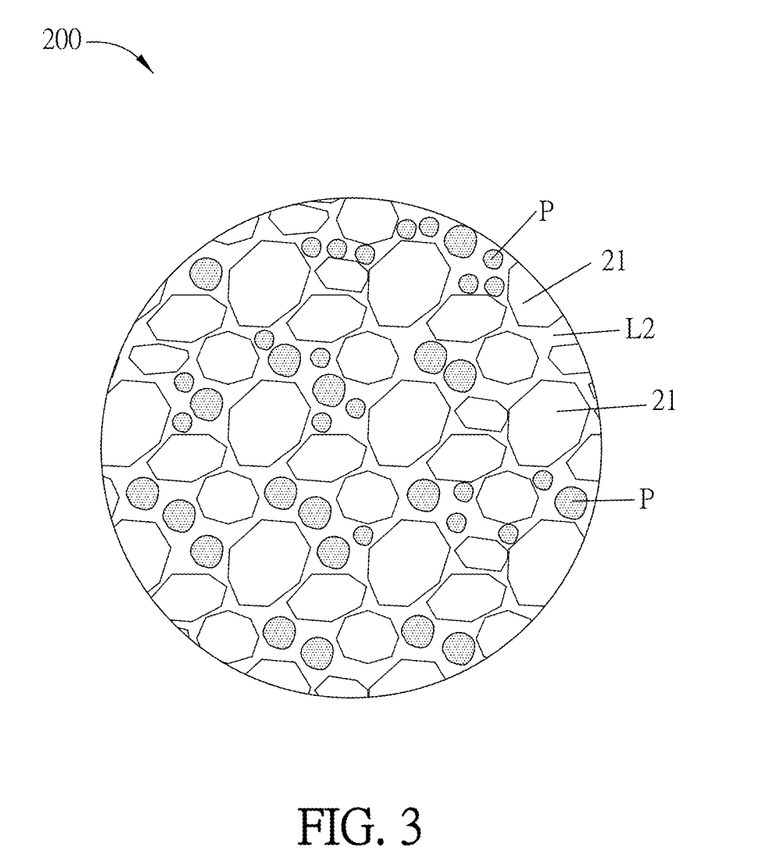
FIG. 3 is a schematic diagram showing the granulated negative electrode material and graphite mixture material, which are uniformly dispersed in the second solvent, of the negative electrode composite slurry of this disclosure.

FIG. 3 is a schematic diagram showing the granulated negative electrode material and graphite mixture material, which are uniformly dispersed in the second solvent, of the negative electrode composite slurry of this disclosure. Referring to FIG. 3, the negative electrode composite slurry 200 comprises the graphite mixture material 21 and the particles P of the granulated negative electrode material. The pores of the graphite mixture material 21 is between 1 μm and 5 and the particle size of the particles P of the granulated negative electrode material is between 3 μm and 5 μm. Accordingly, the particles P can be uniformed filled in the pores of the graphite mixture material 21, thereby increasing the capacity and cycle retention rate of the lithium ion battery containing the negative electrode composite slurry 200.

In this embodiment, the graphite mixture material further comprises a second binder uniformly mixed in the second solvent, and the weight percentage of the second binder is between 1% and 5%. The second binder comprises acrylic acid, polyvinyl alcohol, aqueous acrylic resin, sodium alginate, gelatin, polyacrylonitrile, carboxymethyl cellulose, styrene butadiene rubber, or any combination thereof. Preferably, the second binder comprises carboxymethyl cellulose and styrene butadiene rubber.

In this embodiment, the second solvent is water, polyvinylpyrrolidone, or a combination thereof. Preferably, the second solvent is water. As shown in FIG. 3, the graphite mixture material 21 and the particles P of the granulated negative electrode material can be uniformly dispersed in the second solvent L2.

In this embodiment, 1% to 40% of the graphite is substituted by silicon powder, and the weight percentage of the graphite and the silicon powder in the graphite mixture material is between 20% and 40%. Herein, both of the graphite and the silicon powder can be used to provide the electrical conductive function.

The preparations of the above-mentioned negative electrode material and negative electrode composite slurry will be described in the following examples.

Example 1: Preparation of Negative Material 1

The carbon nanotube and the silicon oxide nano-powder are treated by ultrasonic dispersion. The carbon nanotube (0.5 g), the silicon oxide nano-powder (7.5 g) and polyvinylpyrrolidone (0.1 g) are added to water (50 g). The mixture is treated by ultrasonic dispersion (1600 W) for 2 hours so as to obtain the negative electrode material 1 containing well dispersed carbon nanotube and silicon oxide nano-powder. In this example, the carbon nanotube is used as the carbon material, the silicon oxide nano-powder is used as the silicon nanomaterial, and polyvinylpyrrolidone and water are used as the first solvent.

Example 2: Preparation of Negative Electrode Material 2

The carbon nanotube and the silicon oxide nano-powder are treated by ball milling dispersion. The carbon nanotube (0.5 g), the silicon oxide nano-powder (7.5 g) and Triton (0.1 g) are added to water (50 g). 0.5 mm zirconium balls are used to perform the ball milling dispersion for 4 hours (2000 rpm) so as to obtain the negative electrode material 2 containing well dispersed carbon nanotube and silicon oxide nano-powder. In this example, the carbon nanotube is used as the carbon material, the silicon oxide nano-powder is used as the silicon nanomaterial, water is used as the first solvent, and Triton is used as the dispersant.

Example 3: Preparation of Negative Electrode Material 3

The carbon nanotube, graphene and the silicon oxide nano-powder are treated by ball milling dispersion. The carbon nanotube (0.3 g), the graphene (0.3 g), the silicon oxide nano-powder (7.5 g), and polyvinylpyrrolidone (0.1 g) are added to water (50 g). 0.5 mm zirconium balls are used to perform the ball milling dispersion for 4 hours (2000 rpm) so as to obtain the negative electrode material 3 containing well dispersed carbon nanotube and silicon oxide nano-powder. In this example, the carbon nanotube and graphene are used as the carbon material, the silicon oxide nano-powder is used as the silicon nanomaterial, polyvinylpyrrolidone and water are used as the first solvent, and Triton is used as the dispersant.

Example 4: Preparation of Negative Electrode Material 4

Acrylic acid (0.1 g) is added in the negative electrode material 1 obtained in Example 1. The mixture solution is uniformly mixed and then treated by spray-dry granulation to remove the first solvent and form granules. Then, the dried powder of negative electrode material 4 is obtained. In this example, the carbon nanotube is used as the carbon material, the silicon oxide nano-powder is used as the silicon nanomaterial, polyvinylpyrrolidone and water are used as the first solvent, and acrylic acid is used as the first binder.

Example 5: Preparation of Negative Electrode Material 5

The carbon nanotube and the silicon oxide nano-powder are treated by ultrasonic dispersion. The carbon nanotube (0.5 g), the silicon oxide nano-powder (7.5 g) and Triton (0.1 g) are added to water (50 g). The mixture is treated by ultrasonic dispersion (1600 W) for 2 hours so as to obtain the slurry containing well dispersed carbon nanotube and silicon oxide nano-powder. Acrylic acid (0.1 g) is added to the slurry. The mixture is uniformly mixed and then treated by freeze-dry granulation to remove the solvent. Then, the dried powder of negative electrode material 5 is obtained. In this example, the carbon nanotube is used as the carbon material, the silicon oxide nano-powder is used as the silicon nanomaterial, water is used as the first solvent, Triton is used as the dispersant, and acrylic acid is used as the first binder.

Example 6: Preparation of Negative Electrode Material 6

The carbon nanotube, carbon black and silicon oxide nano-powder are treated by ultrasonic dispersion. The carbon nanotube (0.5 g), the carbon black (0.5 g), the silicon oxide nano-powder (7.5 g), and polyvinylpyrrolidone (0.1 g) are added to water (50 g). The mixture is treated by ultrasonic dispersion (1600 W) for 2 hours so as to obtain the slurry containing well dispersed carbon nanotube and silicon oxide nano-powder. Polyvinyl alcohol (0.1 g) is added to the slurry. The mixture is uniformly mixed and then treated by spray-dry granulation to obtain the dried powder of negative electrode material 6. The negative electrode material 6 is observed by SEM, and the SEM result is shown in FIG. 2A, wherein the negative electrode material 6 is uniformly dispersed and the particle size of the granules of the negative electrode material 6 is between 3 µm and 15 µm. FIG. 2B is an enlarged view of FIG. 2A, wherein the particle size of the granules is between 3 µm and 5 µm.

Example 7: Preparation of Negative Electrode Composite Slurry A

The negative electrode material 1 obtained in Example 1, graphite (150 g), carboxymethyl cellulose (3 g), and styrene butadiene rubber (3 g) are added to water (300 g). The mixture is well mixed for 6 hours so as to obtain the uniformly mixed negative electrode composite slurry A. Herein, water is used as the second solvent, and carboxymethyl cellulose and styrene butadiene rubber are used as the second binder.

Example 8: Preparation of Negative Electrode Composite Slurry B

The negative electrode material 2 obtained in Example 2, graphite (150 g), carboxymethyl cellulose (3 g), and styrene butadiene rubber (3 g) are added to water (300 g). The mixture is well mixed for 6 hours so as to obtain the uniformly mixed negative electrode composite slurry B. Herein, water is used as the second solvent, and carboxymethyl cellulose and styrene butadiene rubber are used as the second binder.

Example 9: Preparation of Negative Electrode Composite Slurry C

The negative electrode material 3 obtained in Example 3, graphite (150 g), carboxymethyl cellulose (3 g), and styrene butadiene rubber (3 g) are added to water (300 g). The mixture is well mixed for 6 hours so as to obtain the uniformly mixed negative electrode composite slurry C. Herein, water is used as the second solvent, and carboxymethyl cellulose and styrene butadiene rubber are used as the second binder.

Example 10: Preparation of Negative Electrode Composite Slurry D

The negative electrode material 4 obtained in Example 4, graphite (150 g), carboxymethyl cellulose (3 g), and styrene butadiene rubber (3 g) are added to water (300 g). The mixture is well mixed for 6 hours so as to obtain the uniformly mixed negative electrode composite slurry D. Herein, water is used as the second solvent, and carboxymethyl cellulose and styrene butadiene rubber are used as the second binder.

Example 11: Preparation of Negative Electrode Composite Slurry E

The negative electrode material 5 obtained in Example 5, graphite (150 g), carboxymethyl cellulose (3 g), and styrene butadiene rubber (3 g) are added to water (300 g). The mixture is well mixed for 6 hours so as to obtain the uniformly mixed negative electrode composite slurry E. Herein, water is used as the second solvent, and carboxymethyl cellulose and styrene butadiene rubber are used as the second binder.

Example 12: Preparation of Negative Electrode Composite Slurry F

The negative electrode material 6 obtained in Example 6, graphite (150 g), carboxymethyl cellulose (3 g), and styrene butadiene rubber (3 g) are added to water (300 g). The mixture is well mixed for 6 hours so as to obtain the uniformly mixed negative electrode composite slurry F. Herein, water is used as the second solvent, and carboxymethyl cellulose and styrene butadiene rubber are used as the second binder.

Example 13: Battery Performance Evaluations of Lithium Batteries Utilizing the Negative Electrode Composite Slurries A-F Obtained by Examples 6-12 as the Negative Electrodes Each of the negative electrode composite slurries A-F and the control material is coated on the 20 μm copper foil to from a thin layer with a thickness of 80 μm. After dried at 120° C. and pressed by 20 kg/cm², the thin layer is punched to obtain a negative electrode sheet with a diameter of 1 cm. The lithium foil with a diameter of 1 cm is used as the positive electrode, the commercial isolation film with a diameter of 1.2 μm is used as the separator, and 1M LiPF6 EC/DEC electrolyte is selected. The electrodes and separator are installed and then the electrolyte is added to form a coin type lithium ion battery. The capacity and evaporation rate of the lithium ion battery are tested by a charge/discharge instrument (Newware BTS-9000) at room temperature. In the charging/discharging test, the cut-off voltage is set between 0 and 2 V, and the charging/discharging rate is set to 0.1 C. The obtained electrical performance results are shown in Table 1. The control material does not include the negative electrode material, and is composed of graphite, carboxymethyl cellulose and styrene-butadiene rubber uniformly mixed in water only. In other words, the control material does not include the carbon nanotube and silicon nanomaterial.

TABLE 1

Results of battery performance evaluations of lithium batteries utilizing the negative electrode composite slurries A-F and control material

| Tested material | First evaporation rate | First reversible capacity (mAh/g) |
| --- | --- | --- |
| Control material | 74% | 400 |
| Negative electrode composite slurry A | 82% | 442 |
| Negative electrode composite slurry B | 81% | 436 |
| Negative electrode composite slurry C | 77% | 428 |
| Negative electrode composite slurry D | 83% | 445 |
| Negative electrode composite slurry E | 82% | 443 |
| Negative electrode composite slurry F | 84% | 451 |

As shown in Table 1, compared with the result of control material, the lithium batteries having the negative electrodes made of the negative electrode composite slurrys A-F have the first evaporation rates between 77% and 84%, which are obviously higher than that made of the control material (74%). In addition, the lithium batteries having the negative electrodes made of the negative electrode composite slurrys A-F have the first reversible capacities between 428 and 451 mAh/g, which are obviously higher than that made of the control material (400 mAh/g). Wherein, the first evaporation rate=discharging capacity/charging capacity×100%.

Figure 4:
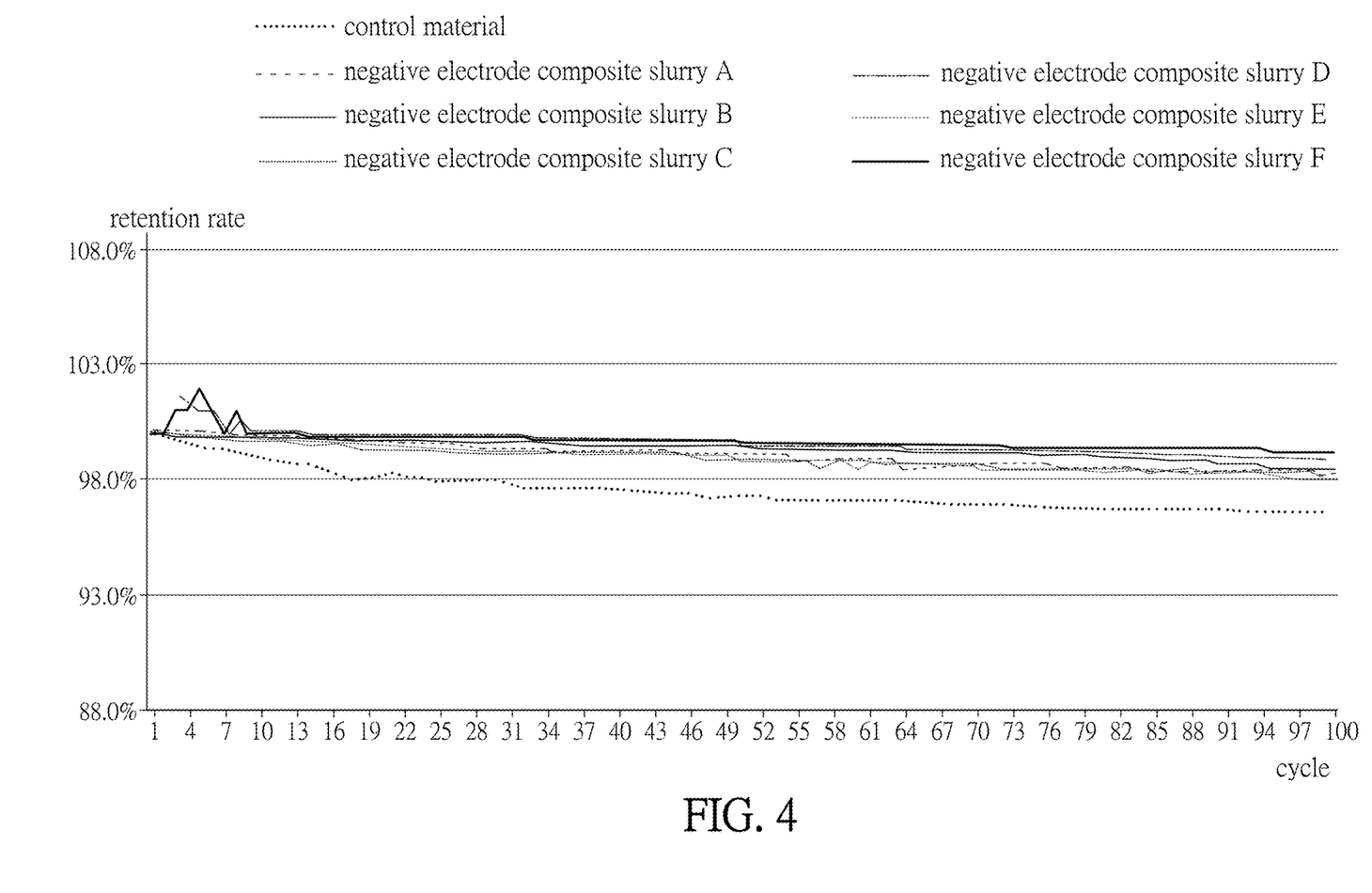
FIG. 4 is a schematic graph showing the curve of capacity retention rate of the lithium ion battery containing the negative electrode composite slurry of this disclosure.

Example 14: Tests for Cycle Retention Rate of Lithium Batteries Utilizing the Negative Electrode Composite Slurries A-F Obtained by Examples 6-12 as the Negative Electrodes The coin type lithium batteries prepared in Example 13, which utilize the negative electrode composite slurrys A-F and the control material as the negative electrodes, are tested in Example 14. The tests of Example 14 are performed by utilizing a charge/discharge instrument (Newware BTS-9000) at room temperature, wherein the cut-off voltage is set between 0 and 2 V, and the charging/discharging rate is set to 0.1 C. After 100 charging/discharging cycles, the capacity retention rates of the lithium batteries are obtained as shown in FIG. 4. FIG. 4 is a schematic graph showing the curve of capacity retention rates of the lithium batteries containing the negative electrode composite slurries of this disclosure.

As shown in FIG. 4, the capacity retention rate of the lithium ion battery made of the control material is lower than 98% after the 31th charging/discharging cycle, but the capacity retention rates of the lithium batteries made of the negative electrode composite slurries A-F are still higher than 98% until the 100th charging/discharging cycle.

Referring to FIG. 4 and Table 1, compared with the lithium ion battery having the negative electrode made of the control material, the lithium batteries having the negative electrodes made of the negative electrode composite slurries A-F obviously have higher first evaporation rates, first reversible capacities, and capacity retention rates, which mean that the lithium batteries of this disclosure have better battery performances.

In summary, the lithium ion battery having the negative electrode made of the negative electrode material and negative electrode composite slurry of this disclosure can have improved capacity, evaporation rate and capacity retention rate, and can prevent the issues of battery expansion and low electrical conductivity, thereby enhancing the performance of the lithium ion battery.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A negative electrode material for a lithium ion battery, comprising:
   a carbon material comprising a carbon nanotube;
   a silicon nanomaterial;
   a first solvent, wherein the carbon material and the silicon nanomaterial are uniformly mixed in the first solvent, wherein the silicon nanomaterial is between 1% and 30% by weight of the negative electrode material, and an amount of the carbon material is 1% to 30% of an amount of the silicon nanomaterial;

a dispersant uniformly mixed in the first solvent, wherein an amount of the dispersant is 20% to 200% of the amount of the carbon material; and a first binder uniformly mixed in the first solvent, wherein the first binder is between 0.1% and 0.3% by weight of the negative electrode material;

wherein a particle size of the silicon nanomaterial is between 10 nm and 200 nm.

2. The negative electrode material of claim 1, wherein the dispersant comprises polyethylene glycol tert-octylphenyl ether, polyethylene glycol octyl phenyl ether, polyvinyl pyrrolidone, sodium dodecyl sulfate, phospholipid, polyoxypropylene polyoxyethylene copolymer, or any combination thereof.

3. The negative electrode material of claim 1, wherein the first binder comprises acrylic acid, polyvinyl alcohol, aqueous acrylic resin, sodium alginate, gelatin, polyacrylonitrile, carboxymethyl cellulose, styrene butadiene rubber, or any combination thereof.

4. The negative electrode material of claim 1, wherein the carbon material further comprises graphene, carbon black, or any combination thereof.

5. The negative electrode material of claim 1, wherein a diameter of the carbon nanotube is between 1 nm and 20 nm, and a length of the carbon nanotube is between 1 μm and 10 μm.

6. The negative electrode material of claim 5, wherein the diameter of the carbon nanotube is between 5 nm and 13 nm, and the length of the carbon nanotube is between 3 μm and 5 μm.

7. The negative electrode material of claim 1, wherein the silicon nanomaterial comprises silicon nano-powder, silicon oxide nano-powder or a combination thereof, a molecular formula of the silicon nanomaterial is SiOx, and x is between 0 and 2.

8. The negative electrode material of claim 1, wherein the first solvent is water, polyvinylpyrrolidone, or a combination thereof.

9. The negative electrode material of claim 1, wherein the negative electrode material is uniformly mixed by ball milling dispersion or ultrasonic dispersion.

10. The negative electrode material of claim 1, wherein the negative electrode material is treated by freeze-dry granulation or spray-dry granulation for removing the first solvent and forming granules with a particle size between 3 μm and 15 μm.

11. The negative electrode material of claim 10, wherein the particle size of the granules is between 3 μm and 5 μm.

12. A negative electrode composite slurry for a lithium ion battery, comprising:

the negative electrode material of claim 1;

a graphite mixture material uniformly mixed with the negative electrode material, wherein the graphite mixture material comprises:

graphite, and a second solvent, wherein the graphite is uniformly mixed in the second solvent, and the graphite is between 20% and 40% by weight of the graphite mixture material; and a second binder uniformly mixed in the second solvent, and the second binder is between 1% and 5% by weight of the graphite mixture material;

wherein 1% to 40% of the graphite is substituted by a silicon powder, and the graphite and the silicon powder in the graphite mixture material is between 20% and 40%.

13. The negative electrode composite slurry of claim 12, wherein before mixing the negative electrode material and the graphite mixture material, the negative electrode material is treated by freeze-dry granulation or spray-dry granulation for removing the first solvent and forming granules with a particle size between 3 μm and 15 μm.

14. The negative electrode composite slurry of claim 13, wherein the particle size of the granules is between 3 μm and 5 μm.

15. The negative electrode composite slurry of claim 12, wherein the second binder comprises acrylic acid, polyvinyl alcohol, aqueous acrylic resin, sodium alginate, gelatin, polyacrylonitrile, carboxymethyl cellulose, styrene butadiene rubber, or any combination thereof.

16. The negative electrode composite slurry of claim 12, wherein the second solvent is water, polyvinylpyrrolidone, or a combination thereof.

* * * * *